Patented Dec. 25, 1951

2,579,759

UNITED STATES PATENT OFFICE 2,579,759

RESINIFYING HYDROXYL FORMYL ACETO-PHENONES, ACETOXY BENZALDEHYDES, AND METHOXY DERIVATIVES THEREOF

Alfred Russell, deceased, late of Cincinnati, Ohio, by Chester R. Shook, administrator, Cincinnati, Ohio No Drawing. Application September 18, 1948, Serial No. 50,234

6 Claims. (Cl. 260—47)

(Granted under the act of March 3, 1883, as amended April 30, 1928; 370 O. G. 757)

This application is made under the act of March 3, 1883, as amended by the act of April 30, 1928, and the invention herein described, if patented, may be manufactured and used by or for the Government of the United States of America for governmental purposes without the payment to me of any royalty thereon.

This invention relates to a new class of polymeric materials and to novel processes for producing them. In particular, it relates to polymeric materials obtained by causing certain bifunctional keto-aldehydes, or their chemical equivalents, to undergo polymerization by interaction between like molecules.

The invention has among its objects provision of a new class of products capable of varied and novel uses and methods for producing them from readily available raw materials.

Polymerization may be defined as that type of chemical reaction that is functionally capable of proceeding indefinitely. This invention is based upon the discovery that compounds of the general formula:

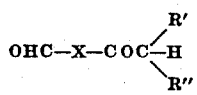

will undergo polymerization. R' and R" are hydrogen or organic radicals attached by carbon to carbon linkage, and X is a divalent organic radical. As will be explained below, the invention is not limited to the polymerization of compounds of this type, but also includes equivalent compounds or combinations of substances which yield the keto-aldehydes under the conditions of the reaction. In general, the keto-aldehydes react very readily, and it is therefore usually more convenient to employ the aforesaid equivalents.

The equivalents may be classified in general as:

(1) Chemicals or combinations of chemicals which result in the introduction of a keto group into the molecule containing an aldehyde group.

(2) The introduction of an aldehyde group into a molecule already containing a keto group.

Examples of the first instance are vanillin monoacetate, which in the presence of $AlCl_3$ can be made to yield 2-hydroxy-3-methoxy-5-formyl-acetophenone, i. e., specific applications of the well-known Fries rearrangement. Furfural and acetyl chloride may be caused to react producing 5-acetyl-furfural, i. e., utilization of the Friedel-Crafts reaction in the direct acylation of an aldehyde. In the second instance, specific applications of the Cattermann reaction, the Cattermann-Koch reaction and the like may be employed.

In the formula given above the bifunctional keto-aldehydes may be aliphatic, aromatic, or heterocyclic in character. The X may be any suitable divalent radical, aliphatic or aromatic in character, while the R' and R" may be hydrogen or organic radicals.

Due to the reactivity of the keto-aldehydes, they are not usually isolated as such but are formed in situ in the reaction zone, and straightway polymerize to yield the products of this invention. The invention is not limited to such procedure, however, but contemplates also the polymerization of the isolated monomeric keto-aldehydes. In general, the structure of the products may be characterized as (1) direct addition products; (2) polymeric alpha, beta-unsaturated ketones, or (3) ketones in which the original character of the polymerizing molecule has been modified, for example, by subsequent ring closure.

From the foregoing it may be seen that a variety of structural configurations are included in the products of this invention. With reference to the above formula the following configurations may be produced through polymerization of the keto-aldehydes or their equivalents.

(1) The direct addition products have the following structure:

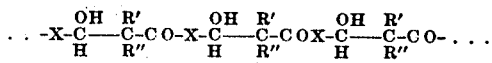

(2) If either R' or R" are hydrogen atoms, the preliminary addition reaction may be followed by subsequent loss of water to give the following structure:

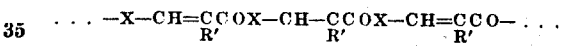

If both R' and R" are hydrogen atoms, the preliminary addition reaction may be followed by subsequent loss of water to give products of the following structure:

(3) If, in addition, these two latter cases also contain an aromatic radical in the X position which in turn is substituted by a suitable reacting group, such as hydroxyl, ortho to the keto group, the character of the polymerized product may be further modified by subsequent ring closure to give products of the following structure:

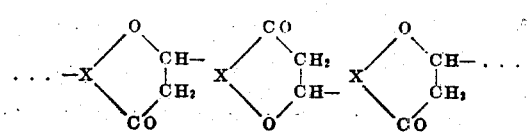

In several of the products it has been discovered that conditions of equilibrium occasionally exist between polymers having a structure represented by the second group and those represented by the third group, or that one may be converted into the other by suitable reaction conditions. For example, under alkaline conditions the straight line structure of polymer (2) is maintained, whereas in the presence of acid the ring-closed polymer (3) predominates.

In general, the products of this invention are amorphous hygroscopic resins, varying in color steam distillation. The reaction product is a dark colored amorphous powder.

The initial reaction involves a Fries rearrangement as follows:

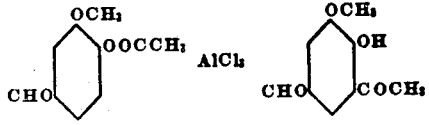

The resulting keto-aldehyde undergoes polymerization in situ to form a polymeric product having the following structural formula:

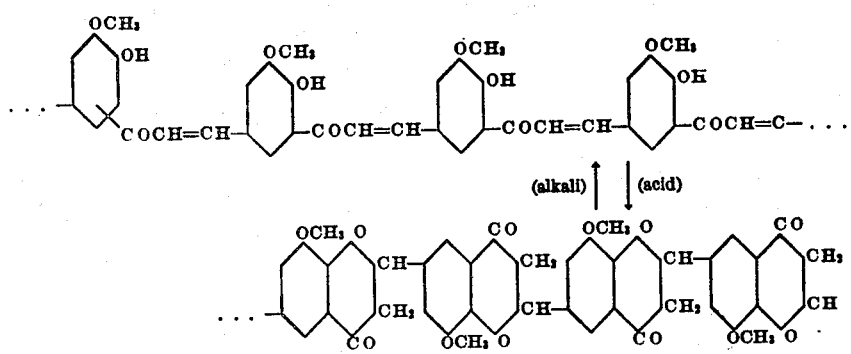

from light fawn to dark brown. They are generally insoluble in the common organic solvents. As illustrated in the examples below, several of the polymers are similar in structure to natural lignins.

The products are useful as soil conditioning agents, extenders for plastics and molding compositions, film-forming compositions, adhesives and the like. They may be solubilized, for example by sulfonation and thus may be used for the above purposes and for such additional purposes as tanning agents and the like.

In general, the polymerization proceeds readily and all that is necessary is to provide chemical contact between molecules of the monomeric keto-aldehyde. The polymerization reaction responds to the usual acidic polymerization catalysts, and its speed may be increased by heating. The usual condensing agents may be used to accelerate the reaction, such as anhydrous $AlCl_3$, ferric chloride, zinc chloride, sulfuric acid and the like. It is convenient but not essential to use inert solvents in the polymerization reaction.

The temperatures of reaction are not critical, and it may be carried out at room temperature or at elevated temperature. With lower temperatures, longer times are required.

The molecular weight or extent or polymerization of the new products is not known. They are probably molecular mixtures of varying length. Nevertheless, there are indications that those products such as Example 1, having structures similar to natural lignin consist of molecules of more uniform molecular weight than the natural products.

The following specific examples illustrate the invention, but are not to be considered as limiting.

*Example 1*

9.7 g. of vanillin monoacetate is dissolved in 50 g. dry nitrobenzene and 13.3 g. of anhydrous aluminum chloride added. This reaction mixture is heated to 120° C. and the temperature held at this value for 1 hr. The resulting reaction mixture is then treated with dilute hydrochloric acid, and the nitrobenzene removed by This product tends to occur in the open chain form under alkaline conditions, while in the presence of acid the ring-closed form predominates.

This product, a poly-8-methoxydihydrobenzopyrone, has all the significant physical characteristics and chemical properties of natural gymnospern or spruce lignin. Quantitative comparison by analysis and analysis of derivatives indicate the so-called gymnospern or spruce lignin and this synthetic product to be identical. Like natural lignin this product dissolves on warming with aqueous sodium bisulfite. Dispersed on filter paper the product gives a pink color with phloroglucinol dissolved in 12 percent aqueous hydrochloric acid.

*Example 2*

Para-acetoxybenzaldehyde (10 g.) is dissolved in 50 g. of dry nitrobenzene, and 18 g. of anhydrous aluminum chloride added. The reaction mixture is heated on a steam bath at 60–70° C. for 2 hrs. The resulting reaction mixture is poured into dilute hydrochloric acid, and the nitrobenzene removed by steam distillation. The polymeric product is a pink colored amorphous powder.

*Example 3*

Salicylaldehyde monoacetate (12.3 g.) is dissolved in 75 cc. dry nitrobenzene, and 20.2 g. anhydrous aluminum chloride added. The reaction mixture is heated to 110°–120° C. for one hour and the product is recovered as in Examples 1 and 2. The product is a fawn colored amorphous powder.

*Example 4*

Anhydrous aluminum chloride (53.2 g.) is suspended in 500 cc. dry carbon disulfide, and 31.4 g. acetyl chloride is added. The mixture is cooled with ice and 38.4 g. furfural dissolved in 100 cc. carbon disulfide is added with stirring over a period of 25 minutes. The reaction mixture was kept cool and stirred for about four hours, and then allowed to stand overnight. The dark reaction product is resinous at first and gradually becomes friable. Hydrogen chloride is evolved during the reaction. The whole reaction mixture is then poured into ice water and the carbon disulfide layer separated.

The dark solid reaction product remains suspended in the water layer. It is collected, crushed, washed with dilute hydrochloric acid, washed again with water, with alcohol and with ether, and finally dried.

The reaction of this example illustrates the formation in situ of an evanescent keto-aldehyde and the subsequent immediate formation of the polymer.

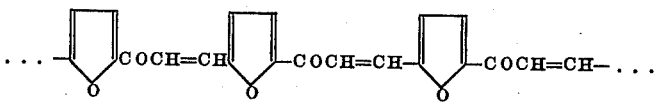

Example 5

In the previous examples the keto-aldehydes are formed in the reaction mixture and polymerized at once under the reaction conditions. In this example the monomeric keto-aldehyde is isolated as such and characterized.

Dry 2,4-dihydroxyacetophenone (15 g.) is dissolved in 250 cc. anhydrous ether. The mixture is cooled in a Dry Ice bath and 23 g. dry zinc cyanide added, followed by 26 g. anhydrous aluminum chloride dissolved in 100 cc. dry ether. Dry hydrogen chloride gas is passed into the cold solution to saturation (4-7 hours), and the precipitated solid collected and washed with dry ether. It is then dissolved in 100 cc. water and the solution heated to boiling for about twenty minutes. An oil is separated out, and is collected. This quickly solidifies and is recrystallized from a mixture of alcohol and water. It is identified as 2,4-dihydroxy-3-formylacetophenone by description and melting point.

For the polymerization, 5 g. of the above keto-aldehyde is dissolved in 100 cc. ethanol and 75 cc. concentrated sulfuric acid added. The whole is refluxed for thirty minutes, cooled and poured into water. The product is a bright red amorphous solid.

What is claimed is:

1. A process comprising heating to at least 60° C. a formyl acetophenone derivative of the formula

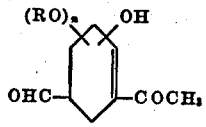

wherein R is selected from the group consisting of hydrogen and methyl and wherein n is a whole number from 0 to 1, and in which compound the indicated OH group is in one of the positions ortho and para to the CHO group, dissolved in a volatile solvent in the presence of an acidic condensing agent to form a water-insoluble condensation product and isolating said product from the reaction mixture.

2. A process comprising heating to at least 60° C. 2,4-dihydroxy-3-formyl-acetophenone dissolved in a volatile solvent in the presence of an acidic condensing agent to form a water-insoluble condensation product and isolating said product from the reaction mixture.

3. A process as in claim 1 wherein the acetophenone derivative has been formed in situ by the Fries reaction.

4. A process comprising heating to at least 60° C. salicylaldehyde monoacetate dissolved in a volatile solvent in the presence of aluminum chloride to form a water-insoluble condensation product and isolating said product from the reaction mixture.

5. A process comprising heating to at least 60° C. vanillin monoacetate dissolved in a volatile solvent in the presence of aluminum chloride to form a water-insoluble condensation product and isolating said product from the reaction mixture.

6. A process comprising heating to at least 60° C. para-acetoxybenzaldehyde dissolved in a volatile solvent in the presence of aluminum chloride to form a water-insoluble condensation product and isolating said product from the reaction mixture.

CHESTER R. SHOOK.
Administrator of the Estate of Alfred Russell, Deceased.

REFERENCES CITED

The following references are of record in the file of this patent:

Claisen et al.: Berichte Deut. Chem. Gesel., vol. 22, 1889, pp. 3273, 3274, 3275.

Freudenberg: Liebig's Annalen der Chemie, vol. 510, pp. 206, 212, 213.

"Organic Reactions," vol. I, Wiley, 1942, pp. 342 and 343; article by Blatt.

Shah et al.: J. Chemical Society (London), 1938 pp. 1828-1830.

Shah et al.: J. Chemical Society (London), 1939, pp. 132 and 133.

Russell: Jour. Amer. Chem. Soc., vol. 70, pp. 2864 and 2865, 1948.